US006988738B2

(12) United States Patent
Lu

(10) Patent No.: US 6,988,738 B2
(45) Date of Patent: Jan. 24, 2006

(54) COMBINATION UNIT OF A GOLF CART AND A GOLF BAG

(75) Inventor: Chin-Min Lu, Taipei (TW)

(73) Assignee: Hi-Mark International Design Inc., Taipei (TW)

( * ) Notice: Subject to any disclaimer, the term of this patent is extended or adjusted under 35 U.S.C. 154(b) by 154 days.

(21) Appl. No.: 10/761,288

(22) Filed: Jan. 22, 2004

(65) Prior Publication Data

US 2004/0150176 A1 Aug. 5, 2004

Related U.S. Application Data

(63) Continuation-in-part of application No. 10/066,586, filed on Feb. 6, 2002, now abandoned.

(51) Int. Cl.
*B62B 1/12* (2006.01)
*B62B 1/00* (2006.01)

(52) U.S. Cl. ............................ 280/47.26; 280/47.131; 280/47.17; 280/47.21; 280/47.24; 280/47.315; 280/646; 280/DIG. 6

(58) Field of Classification Search ........... 280/47.131, 280/47.17, 47.21, 47.24, 47.26, 47.315, 646, 280/DIG. 6, 652
See application file for complete search history.

(56) References Cited

U.S. PATENT DOCUMENTS

| | | | |
|---|---|---|---|
| 4,522,299 A | 6/1985 | Clark | 206/315.3 |
| 4,890,856 A | 1/1990 | Mursch et al. | 280/646 |
| 4,896,897 A | 1/1990 | Wilhelm | 280/655 |
| D405,607 S | 2/1999 | Sundara et al. | D3/255 |
| 6,050,592 A | 4/2000 | Kim | 280/652 |
| 6,131,917 A | 10/2000 | Walsh | 280/43.1 |
| 6,186,522 B1 | 2/2001 | Weis | 280/37 |
| D450,188 S | 11/2001 | Maeng | D3/320 |

*Primary Examiner*—Bryan Fischmann
*Assistant Examiner*—Cynthia F. Collado
(74) *Attorney, Agent, or Firm*—Troxell Law Office, PLLC

(57) ABSTRACT

A combination unit of a golf cart and a golf bag, wherein the golf bag is provided fixedly on an inner housing of the golf bag with a frame, the inner housing has a bottom portion which has two receiving spaces on lateral side, the inner housing has a groove on the abdomen. The golf cart has a central receiving seat to carry struts for two wheels and a stretchable and contractible hand pull-bar. The central receiving seat is embedded in the groove and has an upper and a lower positioning hole, so that the hand pull-bar can be positioned in the upper or the lower positioning hole in its stretching and contracting stroke. The wheels are provided on the bottom end of the golf cart and are collapsible for storing respectively in the two receiving spaces of the bottom portion. The diameters of the wheels are larger than the heights of the receiving spaces. The whole structure can be towed be rolling of the wheels both in collapsing and stretching states, for easy operation and convenient carrying and storing.

11 Claims, 11 Drawing Sheets

22 123 122 1 12 11 222 212 123 13 24 21 131 25 3 2

COMBINATION UNIT OF A GOLF CART AND A GOLF BAG

The present application is a continuation in part patent application of Ser. No. 10/066,586 filed on Feb. 6, 2002 now abandoned.

BACKGROUND OF THE INVENTION

1. Field of the Invention

The present invention relates to a combination unit of a golf cart with a golf bag, and especially to a combination unit having a golf bag and a golf cart structure, it has the effects of ability of being towed by rolling both in collapsing and stretching states, simplicity for operation and convenience for carrying etc., it suits the structures such as for combining a golf cart with a golf bag or for combining the like.

2. Description of the Prior Art

Since the golf game was widely promoted, the modes of combination of a golf cart with a golf bag have been highly thought of by users and manufacturers, and various combinations of golf carts with golf bags have been developed accordingly.

A golf cart is a specific appliance for carrying a golf bag, in striking golf balls in a golf course, generally golf carts are used to save carrying of golf bags on the backs of people and to alleviate loadings of people, the golf bags are placed on the golf carts to allow players to tow the golf carts during walking. However, the golf bags must be installed on the golf carts before using, and must be detached from the golf carts after using; if they are to be carried by a car, the golf bags and the golf carts must be carried in a mutual separate mode. These are very cumbersome, and they occupy too much space when in storage; thereby, they have the defects of inconvenience of using and requiring larger space for storage.

SUMMARY OF THE INVENTION

The main object of the present invention is to provide a combination unit of a golf cart with a golf bag, with the combination unit having the golf bag and the golf cart structure, the whole volume of the golf cart and the golf bag can be largely reduced; the present invention is convenient for carrying and storing, and thereby practicality as well as convenience thereof are increased.

Another object of the present invention is to provide a combination unit of a golf cart with a golf bag, by the designing that the diameters of wheels of the golf cart are larger than the heights of the spaces respectively at both sides at the bottom of the golf cart, the whole structure can be towed by rolling of the wheels both in collapsing and stretching states, convenience of use can thus be increased.

Another object of the present invention is to provide a combination unit of a golf cart with a golf bag operationable by pressing buttons to stretch/extend the golf cart easily and by pulling out the hand pull-bar effortlessly.

To get the above stated objects, the present invention is a combination unit of a golf bag, a golf cart structure and two wheels. The golf bag has an inner housing with a frame thereon, the bottom portion of the inner housing has on the two lateral sides thereof two receiving spaces, and the inner housing is formed at the abdomen thereof a groove. The golf cart structure has a central receiving seat to carry the struts of the wheels and a stretchable and contractible hand pull-bar. The central receiving seat is embedded and combined in the groove of the inner housing. The stretchable and contractible hand pull-bar is provided axially in the central receiving seat, and in the inner housing of the golf bag. The central receiving seat is provided with an upper and a lower positioning hole, in order that the stretchable and contractible hand pull-bar is positioned in the upper or the lower positioning hole in its stretching and contracting stroke. The golf cart structure has on the bottom end thereof the two wheels able to be collapsed for placing in the two receiving spaces at the two lateral sides of the bottom portion of the inner housing. The diameters of the wheels are larger than the heights of the spaces respectively, the whole structure can thereby be towed by rolling of the wheels both in collapsing and stretching states; the present invention thereby is convenient and fast for operation as well as convenient for carrying and storing, and thereby practicality as well as convenience thereof are increased. An elastic member is disposed on the lower portion of the central receiving seat to support and spring up the hand pull-bar. An upper button and a lower button are disposed respectively on the upper and the lower positioning hole of the central receiving seat.

The present invention will be apparent in its characteristics and features after reading the detailed description of the preferred embodiment thereof in reference to the accompanying drawings.

DETAILED DESCRIPTION OF THE PREFERRED EMBODIMENT

Figure 1:
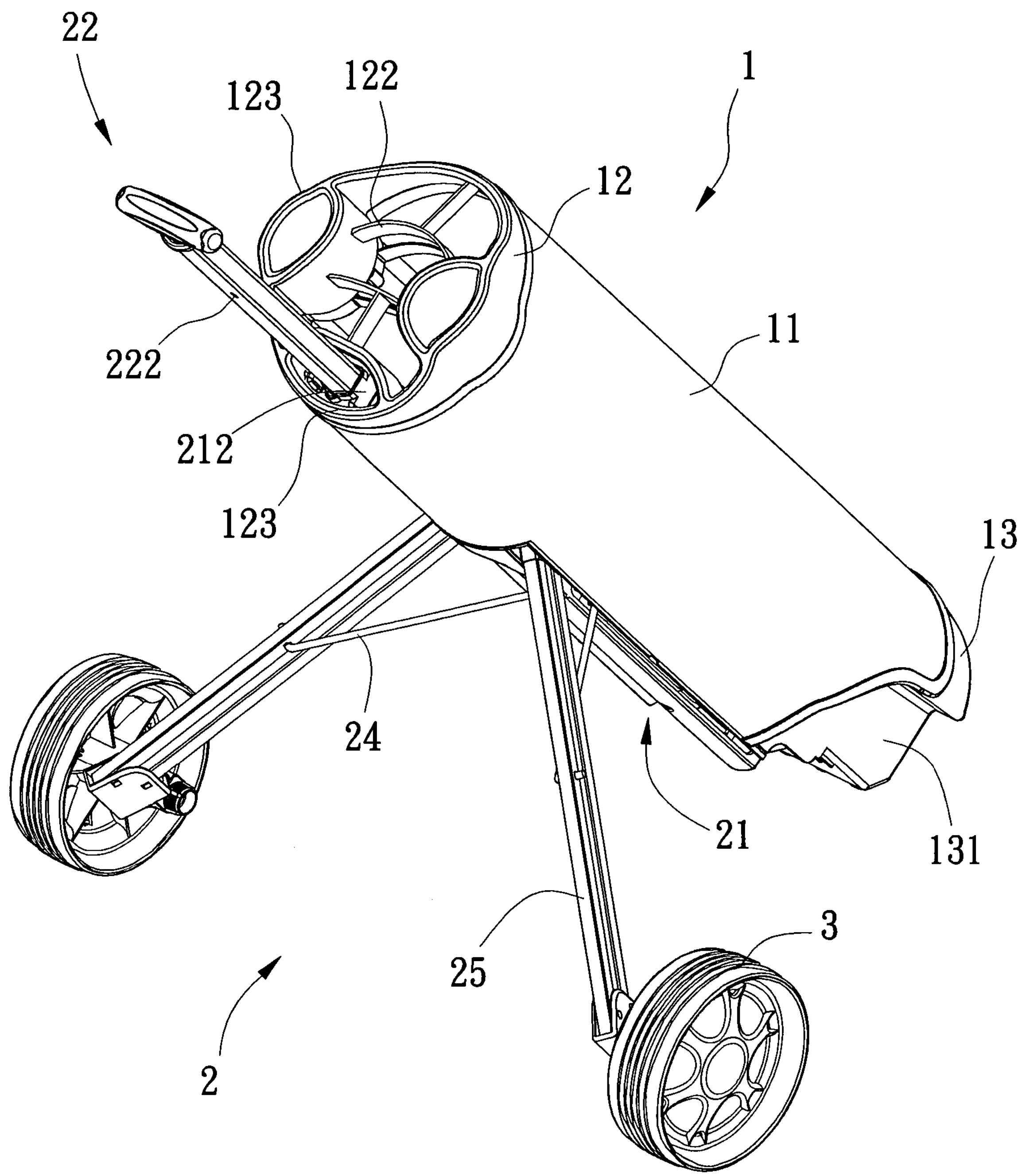
FIG. 1 is a perspective view of the first embodiment of the present invention.
Figure 2A:
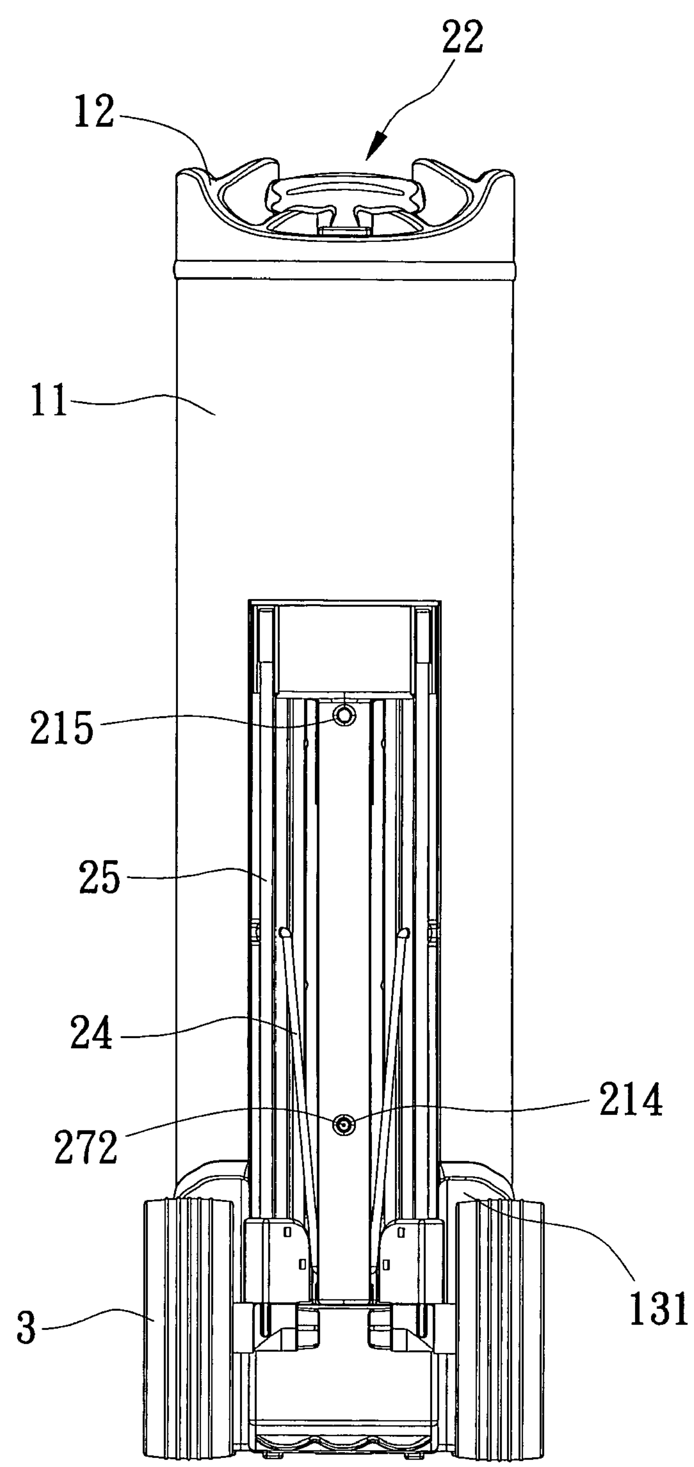
FIG. 2*a* is a rear side view of the first embodiment of the present invention, wherein the hand pull-bar is contracted.
Figure 2B:
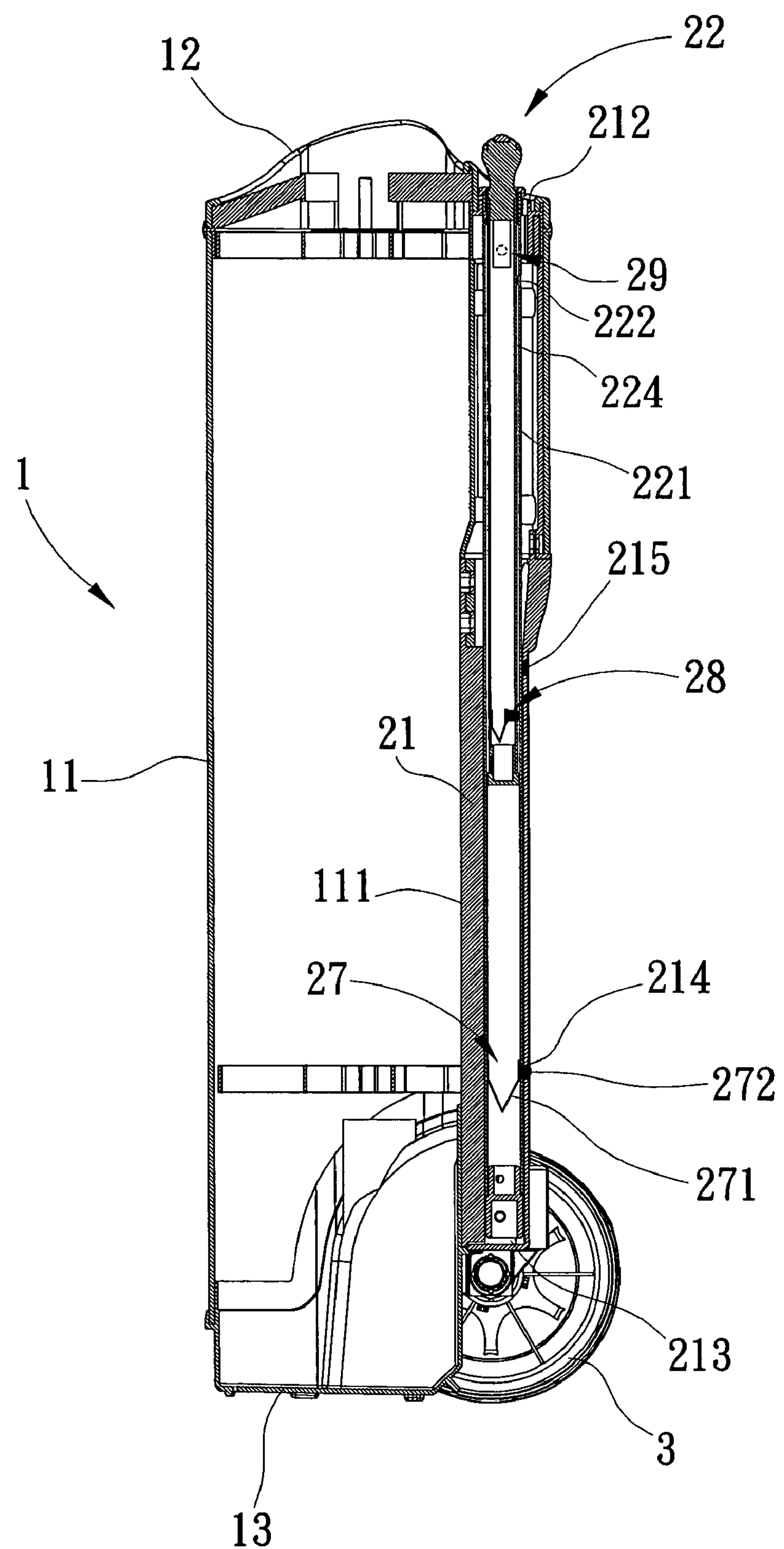
FIG. 2*b* is a sectional view of another side of the first embodiment of the present invention, wherein the hand pull-bar is contracted too.
Figure 3A:
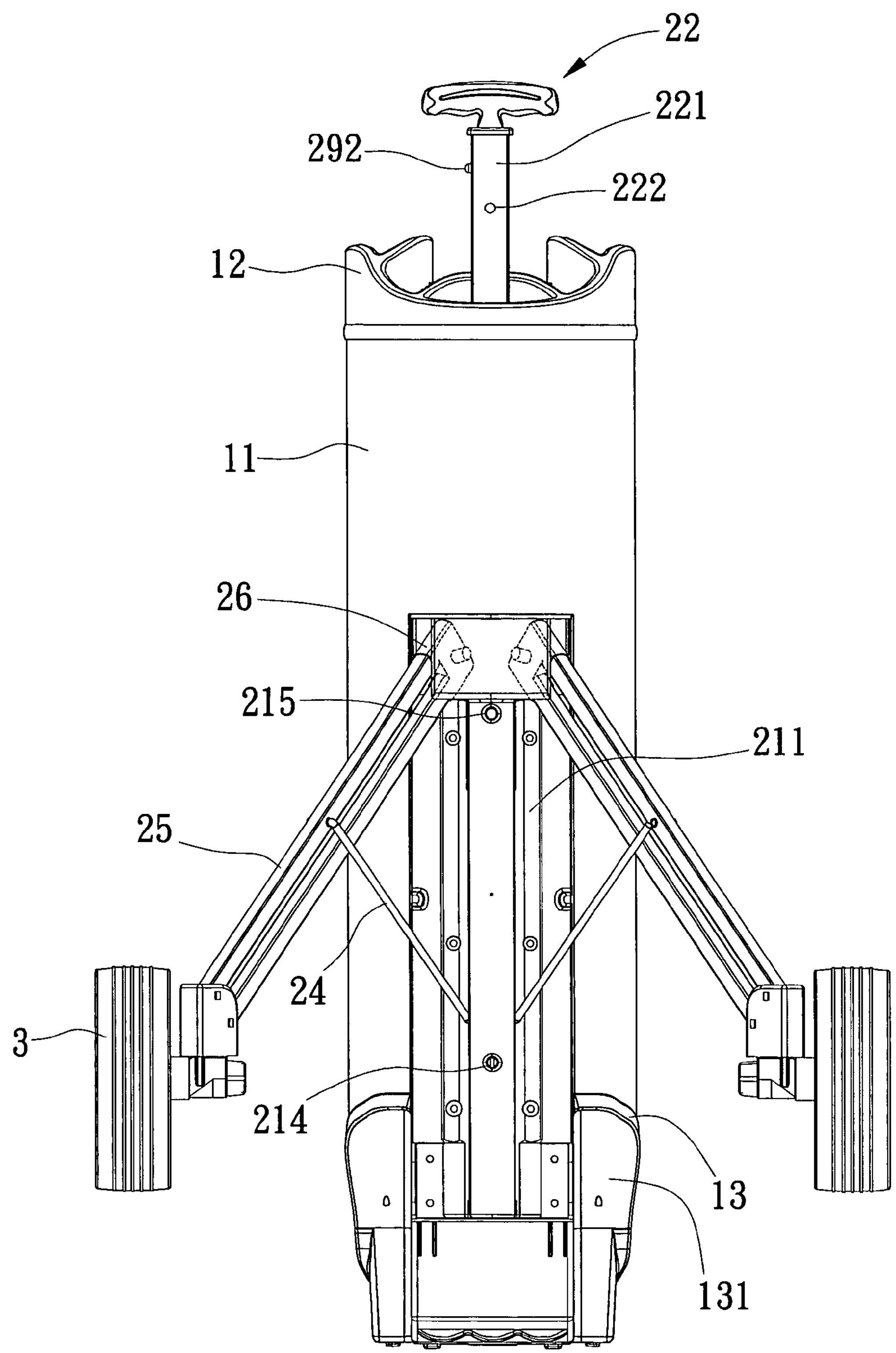
FIG. 3*a* is a rear side view of the first embodiment of the present invention, wherein the hand pull-bar is being pulled to stretch out.
Figure 3B:
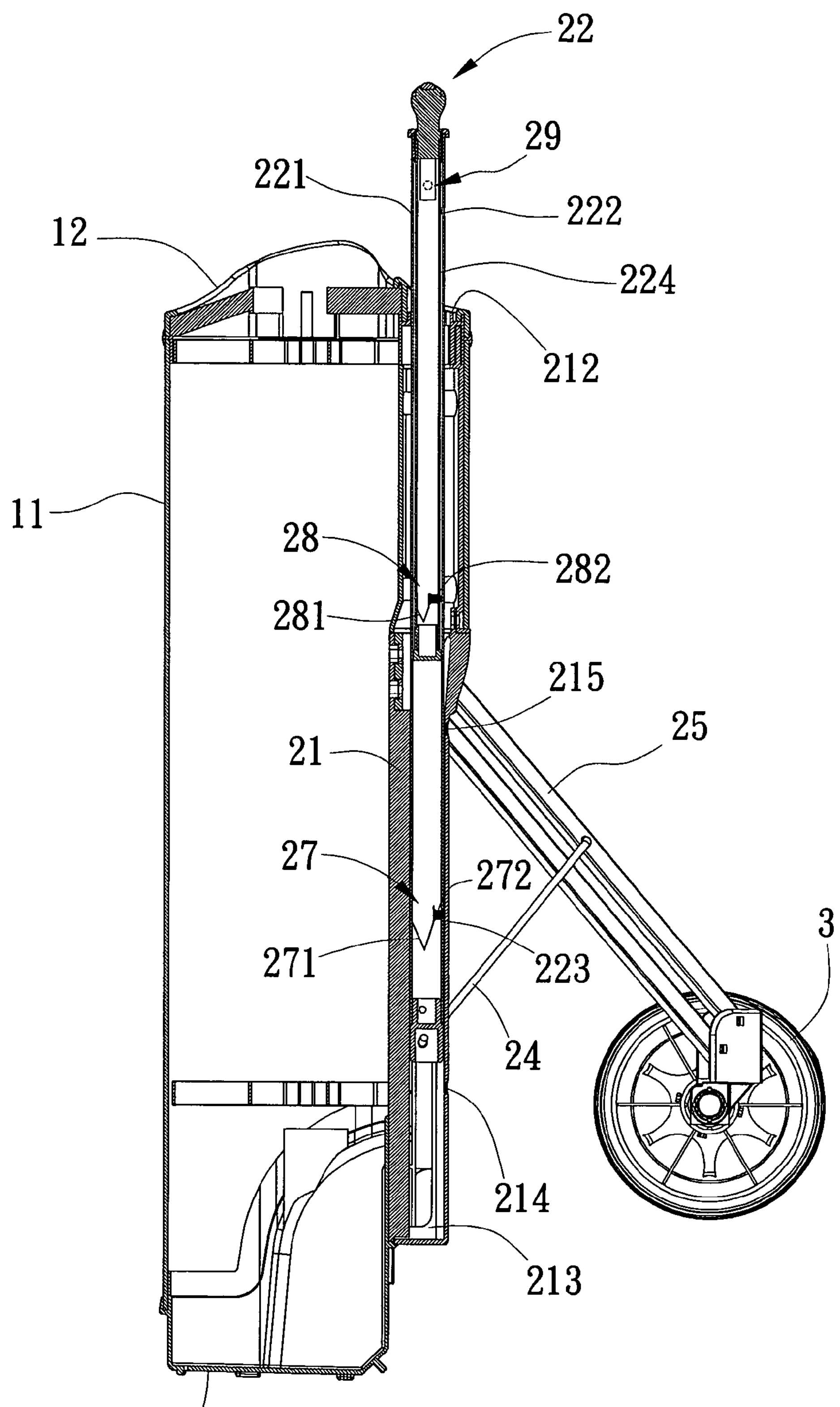
FIG. 3*b* is a sectional view of another side of the first embodiment of the present invention, wherein the hand pull-bar is being pulled to stretch out too.

Referring to FIGS. 1–5*b*, the present invention is a combination unit of a golf cart with a golf bag, and is comprised of a golf bag 1, a golf cart structure 2 and two wheels 3.

The golf bag 1 is provided fixedly on an inner housing 11 thereof with a frame 12, the inner housing 11 has a bottom portion 13, the frame 12 is provided with a plurality of mutually spaced partition plates 122 and three circle frames 123. The outer edge of the bottom portion 13 of the inner housing 11 is arciform, and the bottom portion 13 is provided on the two lateral sides thereof with two receiving spaces 131 to receive the two wheels 3. The inner housing 11 is provided on the bottom abdomen thereof with a groove 111.

The golf cart structure 2 has a central receiving seat 21 to carry the struts 25 for the wheels 3 and a stretchable and contractible hand pull-bar 22. The central receiving seat 21 is embedded and combined in the groove 111 of the inner housing 11; the stretchable and contractible hand pull-bar 22 is provided axially in the central receiving seat 21, and in the inner housing 11 of the golf bag. The central receiving seat 21 is provided with a receiving housing 213, an upper positioning hole 215 and a lower positioning hole 214 are provided on the outer wall surface of the central receiving seat 21 in the scope of the length of the receiving housing 213. Two openings 211 are formed on the two lateral sides of the receiving housing 213. The stretchable and contractible hand pull-bar 22 is movable or fixed at upper positioning hole 215 or at lower positioning hole 214 within the receiving housing 213; the stretchable and contractible hand pull-bar 22 includes an inner sleeve 224 and an outer sleeve 221 which is provided around and movably connected with the inner sleeve 224. The outer sleeve 221 is provided on the upper wall thereof with an engaging hole 222, and on the lower wall thereof with an engaging hole 223; and is provided on the inner wall thereof with a first locking member 27. The first locking member 27 engages with one end of a folded spring leaf 271, the other end of the folded spring leaf 271 is fixedly provided with a snap catch 272 which is engaged in the engaging hole 223 on the lower wall of the outer sleeve 221. The hand pull-bar 22 extends through a front one of the three circle frames 123 on the frame 12, and a sliding auxiliary portion 212 is provided on the upper area of the central receiving seat 21 in the front circle frame 123 on the frame 12 for extending of the hand pull-bar 22 therethrough, hence the hand pull-bar 22 can be stable in sliding. The inner sleeve 224 has an engaging hole 225 on the lower portion thereof, and is provided on the inner wall thereof with a second locking member 28. The second locking member 28 on the inner wall of the inner sleeve 224 engages with one end of a folded spring leaf 281; the other end of the folded spring leaf 281 is fixedly provided with a snap catch 282 which is provided in the engaging hole 225 on the lower wall of the inner sleeve 224. A third locking member 29 is provided on the inner wall of the inner sleeve 224 and engages with one end of a folded spring leaf 291, the other end of the folded spring leaf 291 is fixedly provided with a snap catch 292 which is provided in engaging holes respectively provided on the walls of the outer sleeve 221 and the inner sleeve 224.

The central receiving seat 21 is provided with two joints 26 formed by two sets of transverse sheets to movably connect with two struts 25. The struts 25 have on the bottom ends thereof two wheels 3, and are movably connected each with a link 24 on the inner side near the middle thereof, the other ends of the links 24 are movably connected to the bottom wall of the outer sleeve 221. The diameters of the wheels 3 are larger than the heights of the receiving spaces 131; the whole structure in collapsing can thereby be in the shape of a golf bag apparently. The wheels 3 protrude out of the receiving spaces 131 at the two lateral sides of the bottom portion 13 of the inner housing 11, the golf bag 1 is moved by means of the wheels 3. When the golf cart structure 2 is stretched out, the wheels 3 and the bottom 13 of the golf bag 1 form on the ground a triangle, the hand pull-bar 22 can be pulled to stretch upwardly, so that the golf bag 1 is mounted on the golf cart 2 and can be towed in the golf course.

With the above stated elements constructing the combination unit of a golf cart 2 with a golf bag 1, referring to FIGS. 1–6, the present invention is characterized by that, the golf bag 1, the golf cart structure 2 and the two wheels 3 are connected mutually; and by connecting the central receiving seat 21 of the golf cart structure 2 with the two struts 25 and the stretchable and contractible hand pull-bar 22, when in collapsing (referring to FIGS. 2*a* and 2*b*), the first locking member 27 provided on the inner wall of the outer sleeve 221 will make the snap catch 272 engaged in the engaging hole 223 on the lower wall of the outer sleeve 221 and in the lower positioning hole 214 of the central receiving seat 21 by the action of the spring leaf 271. Thereby, the outer sleeve 221 of the stretchable and contractible hand pull-bar 22 is firmly combined with the lower positioning hole 214 of the central receiving seat 21. When the snap catch 272 is pressed down (referring to FIGS. 2*a*–4*b*), the stretchable and contractible hand pull-bar 22 is pulled out in its first stretching stage, at this moment, the second locking member 28 provided on the inner wall of the inner sleeve 224 will make the snap catch 282 engaged with the inner wall of the outer sleeve 221 by the action of the spring leaf 281. And further, the inner sleeve 224 and the outer sleeve 221 are stretched and moved upwardly together from their bottommost positioning state (there is no relative displacement between the inner sleeve 224 and the outer sleeve 221) until the snap catch 272 of the first locking member 27 slides to the upper positioning hole 215 of the central receiving seat 21, then the snap catch 272 is elastically engaged in the upper positioning hole 215 of the central receiving seat 21 and the engaging hole 223 on the lower wall of the outer sleeve 221. When the hand pull-bar 22 is pulled out, the two lateral links 24 are moved upwardly, and in turn the two struts 25 and the wheels 3 are braced up; thereby, the central receiving seat 21, the two struts 25 and the links 24 are in a stable bracing up and positioning state.

Figure 4A:
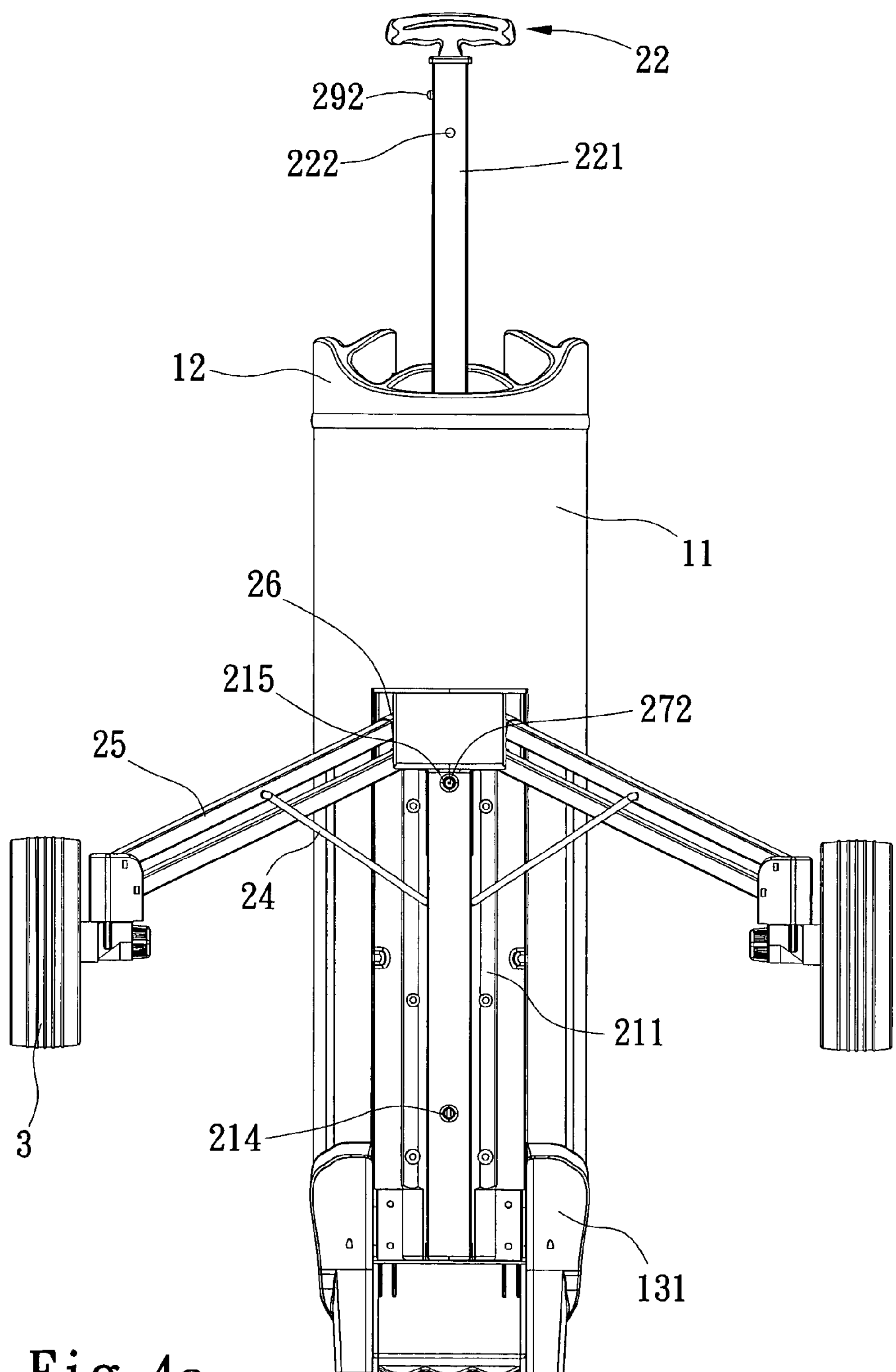
FIG. 4*a* is a rear side view of the first embodiment of the present invention, wherein the hand pull-bar has been completely pulled out.
Figure 4B:
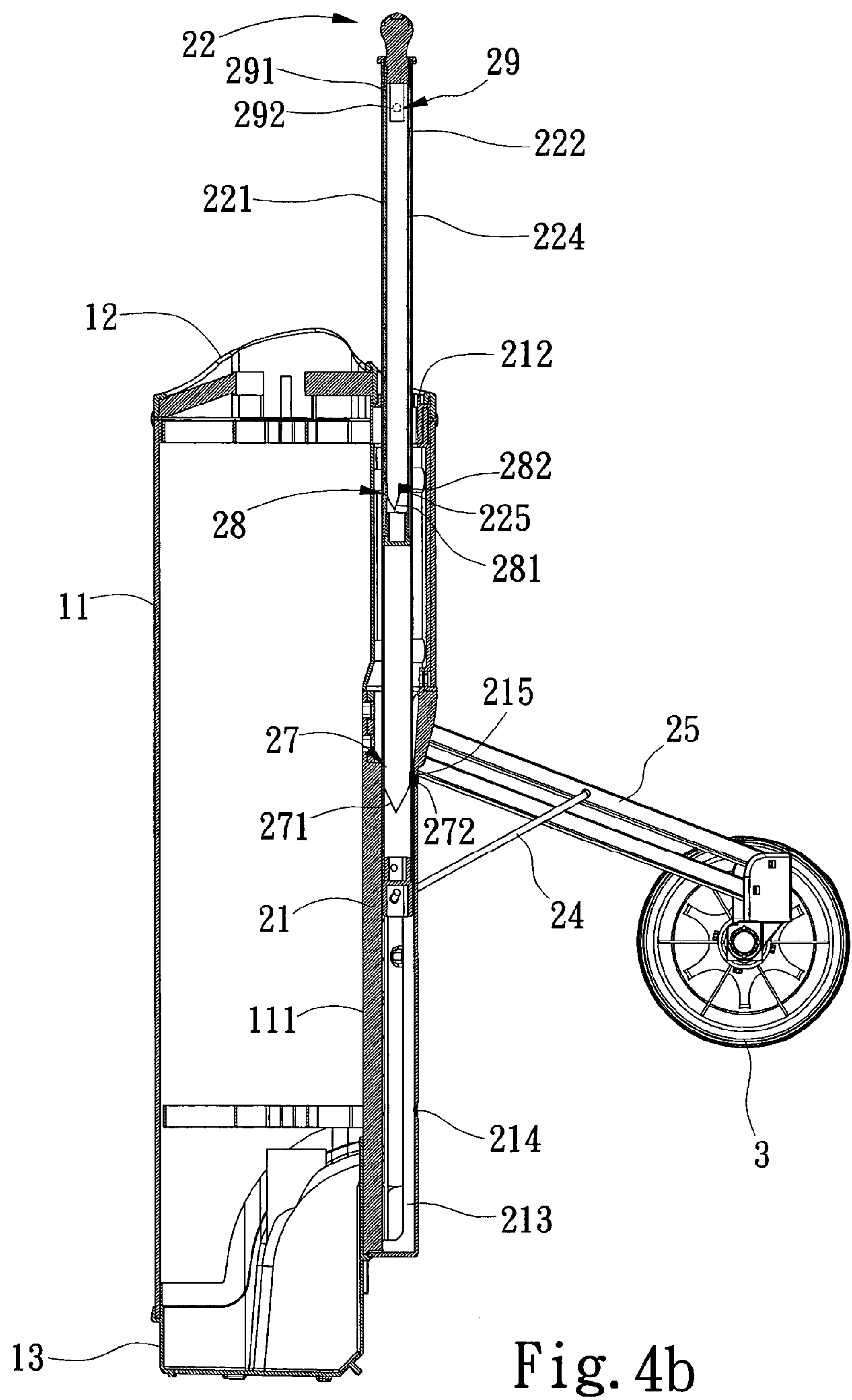
FIG. 4*b* is a sectional view of another side of the first embodiment of the present invention, wherein the hand pull-bar has been completely pulled out too.
Figure 5:
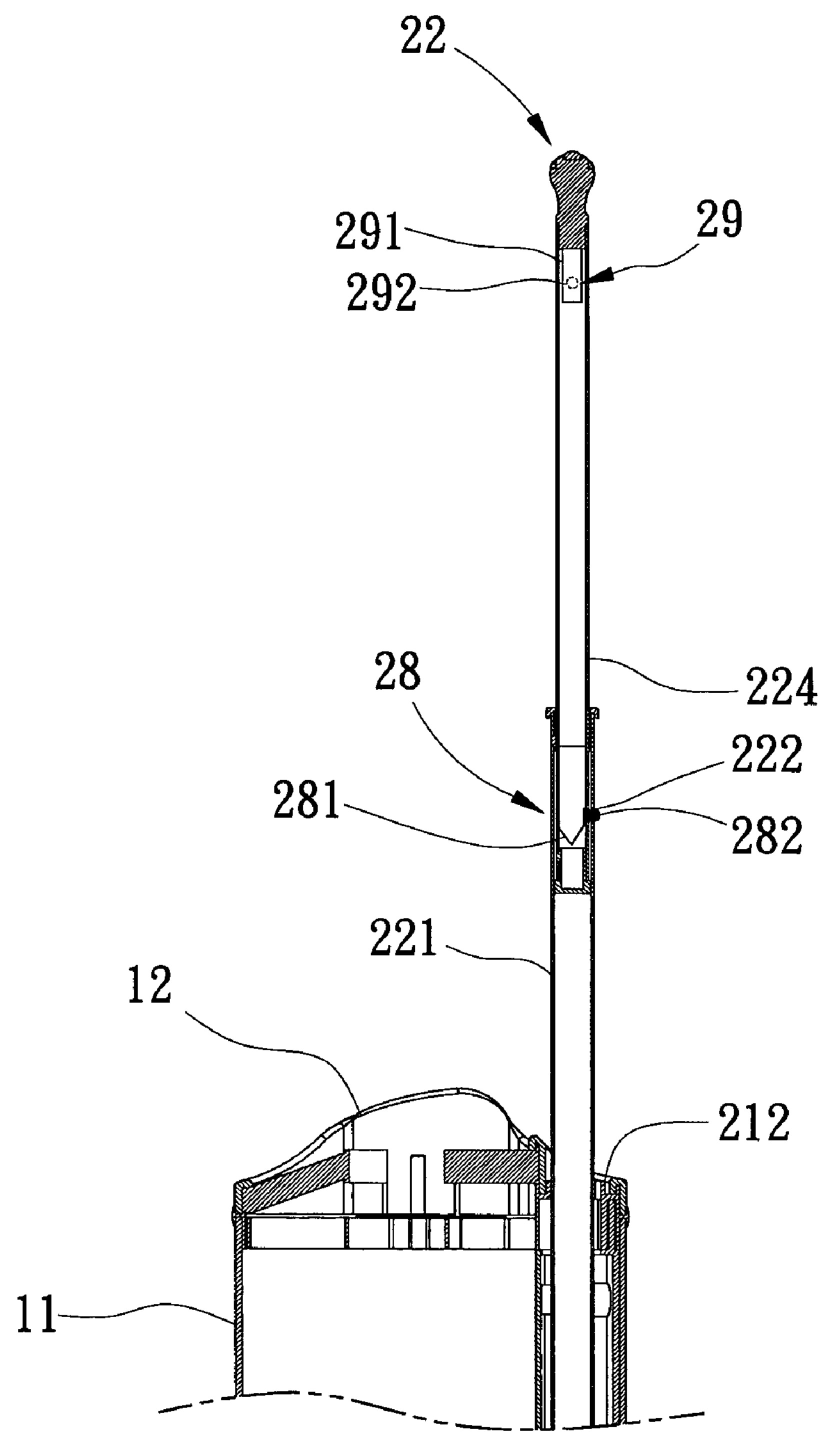
FIG. 5 is a sectional schematic side view showing the hand pull-bar of the first embodiment of the present invention has been pulled out of its position.

Referring to FIGS. 4*a*–5, the purpose of providing the third locking member 29 is to control fixing and unlocking between the inner sleeve 224 and the outer sleeve 221. When the snap catch 292 of the third locking member 29 is pressed down, the inner sleeve 224 can be pulled out as being the second stretching stage of the stretchable and contractible hand pull-bar 22 (at this time, the outer sleeve 221 is stationary) until the snap catch 282 of the second locking member 28 slides to the engaging hole 222 of the outer sleeve 221, then the snap catch 282 is elastically engaged in the engaging hole 225 on the inner sleeve 224 and the engaging hole 222 of the outer sleeve 221. Thereby, the hand pull-bar 22 is stretched for use. On the contrary, the hand pull-bar 22 can be contracted by simply pressing down the snap catch 282 and the snap catch 272 to restore the state of being engaged in the lower positioning hole 214 the central receiving seat 21. And no further detailed description is needed here.

In fact, the third locking member 29 can be omitted, and when the hand pull-bar 22 is in the second stretching stage, it needs only to make the snap catch 282 of the second locking member 28 on the inner sleeve 224 engage with the inner wall of the outer sleeve 221 by the action of the spring leaf 281 to make elastic engagement between the inner sleeve 224 and the outer sleeve 221, and the inner sleeve 224 can be directly pulled out for the second stretching stage (at this time, the outer sleeve 221 is stationary) until the snap catch 282 of the second locking member 28 slides to the engaging hole 222 of the outer sleeve 221, then the snap catch 282 is elastically engaged in the engaging hole 225 on the inner sleeve 224 and the engaging hole 222 of the outer sleeve 221 by the elastic restoration of the spring leaf 281. This also results that the hand pull-bar 22 is stretched for use.

Meantime, the two links 24 on the hand pull-bar 22 move the struts 25 to make collapsing of the wheels 3 in the receiving spaces 131 on the two lateral sides of the bottom portion 13, this largely reduces the entire volume of the whole unit. The unit can be towed by rolling of the wheels 3 both in collapsing and stretching states; the present invention thereby has the effects of ability to be towed by rolling both in collapsing and stretching states, simplicity and fastness for operation and convenience for carrying, storing etc., and thereby practicality as well as convenience thereof are increased, thus the combination unit of a golf cart with a golf bag can be completed.

Referring to FIG. 1, when in use, the golf bag 1, the golf cart structure 2 and the two wheels 3 are mutually connected according to the aforesaid; then the golf cart structure 2 is stretched out, the bottom portion 13 of the golf bag 1 and the struts 25 let out the wheels 3 to form firm supporting.

Figure 6:
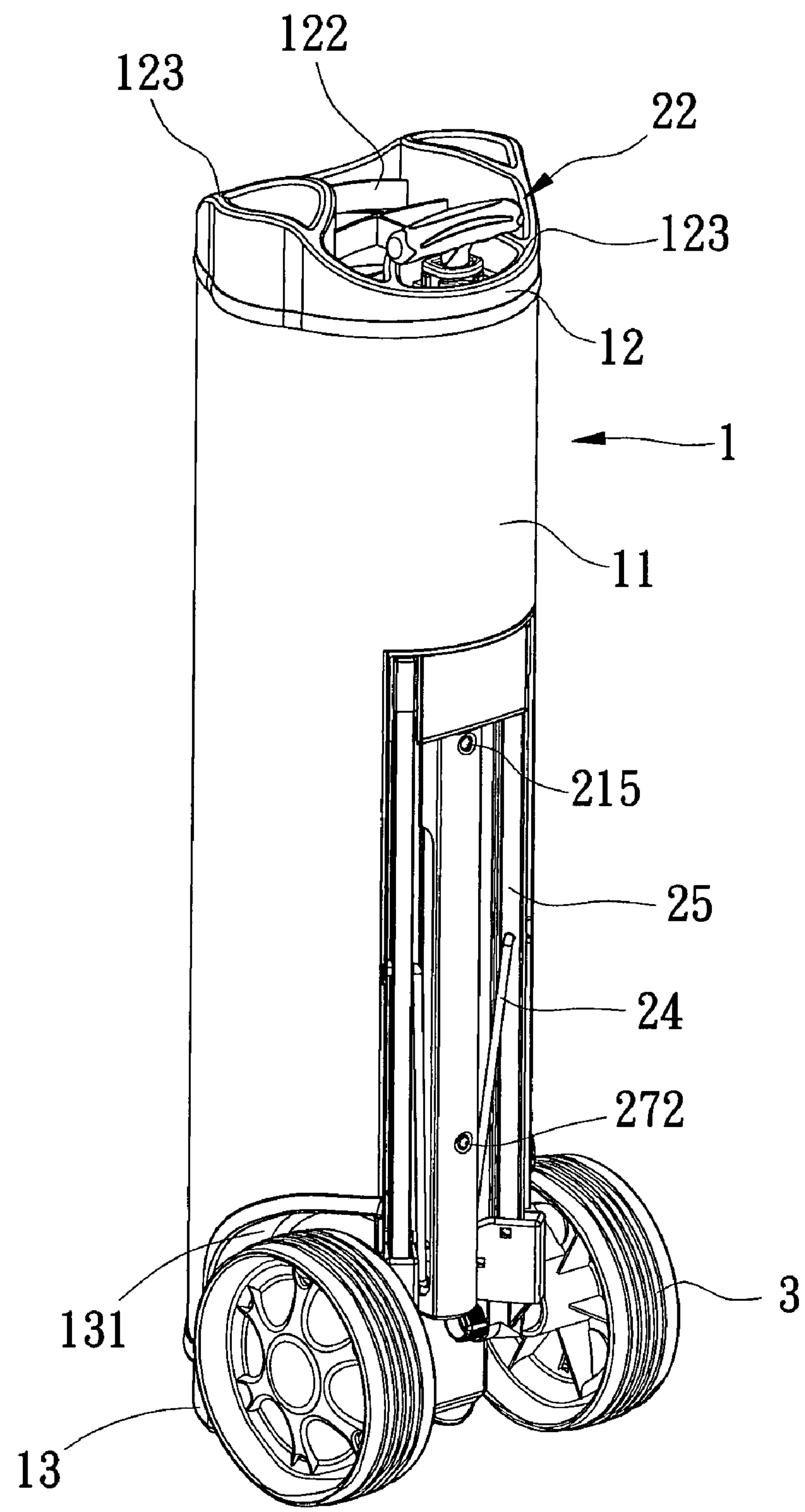
FIG. 6 is a schematic perspective view showing the hand pull-bar of the first embodiment of the present invention has been completely contracted in use.

Referring to FIG. 6, when in use, the golf bag 1 and the golf cart structure 2 are collapsed, now the wheels 3 are collapsed to be stored in the spaces 131 on the two lateral sides of the bottom portion 13, and the struts 25 as well as the two links 24 are received in the meantime in the openings 211 of the central receiving seat 21 to largely reduce the volume of the whole unit to be convenient for carrying. The unit can be towed by rolling of the wheels 3 both in collapsing and stretching states even in an uneven golf course.

The description above relating to the golf bag 1 depicted are only described for the part in the inner housing 11; in practice, the inner housing 11 can be used in mating with any of various bags outside of it (not shown). It needs only that the central receiving seat 21 is arranged to have a zipper; so that after collapsing, the zipper can be pulled to close, and when in stretching out the struts 25, the zipper can be pulled to open.

The longitudinal lengths in the inner housing 11 of the golf bag 1 of the present invention from the interior portions of the two lateral circle frames 123 to the bottom portion 13 are shorter such that they can receive iron clubs or umbrellas, while the longitudinal length from the portion outside of the circle frames 123 to the bottom portion 13 in the inner housing 11 is longer to receive wooden golf clubs.

Figure 7:
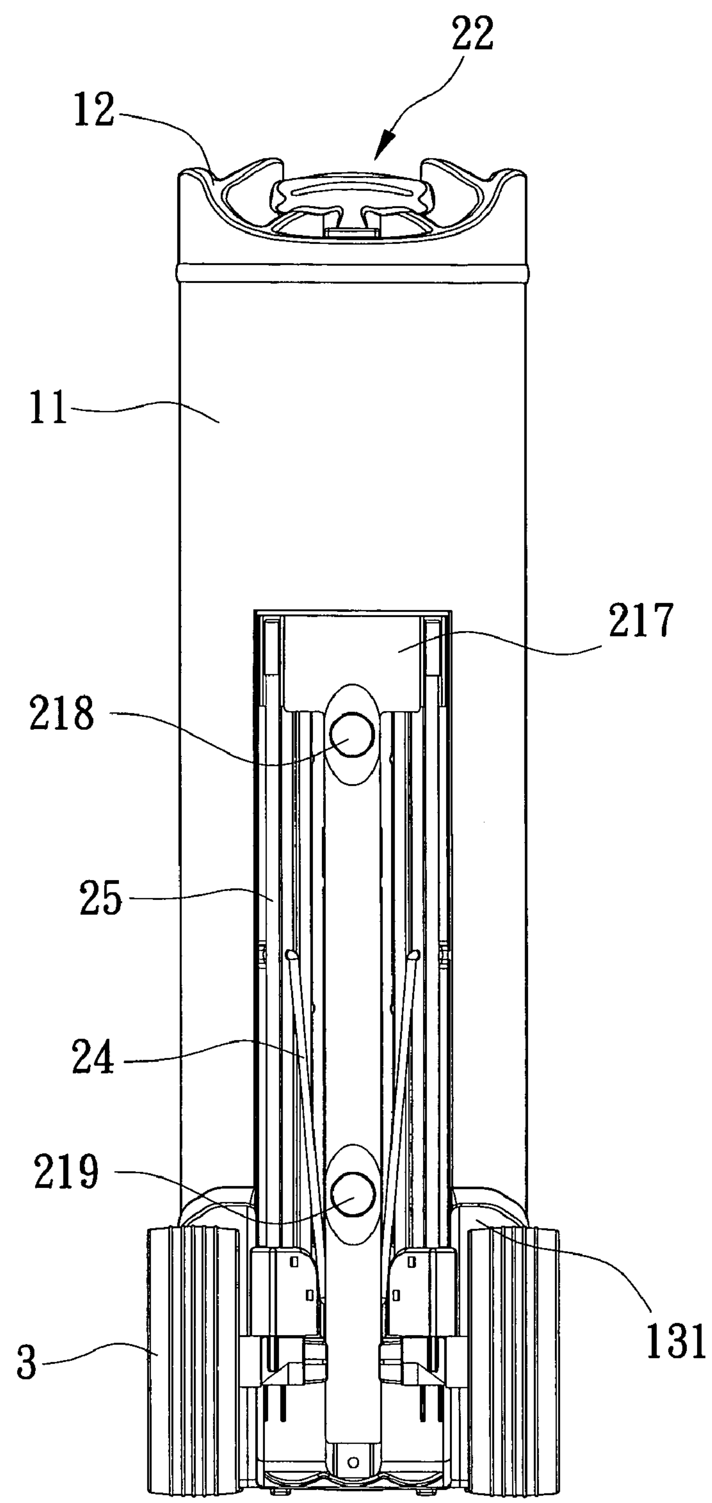
FIG. 7 is a rear side view of the second embodiment of the present invention with an upper button and a lower button disposed respectively on the upper and the lower positioning hole of the central receiving seat.
Figures 8A, 8B:
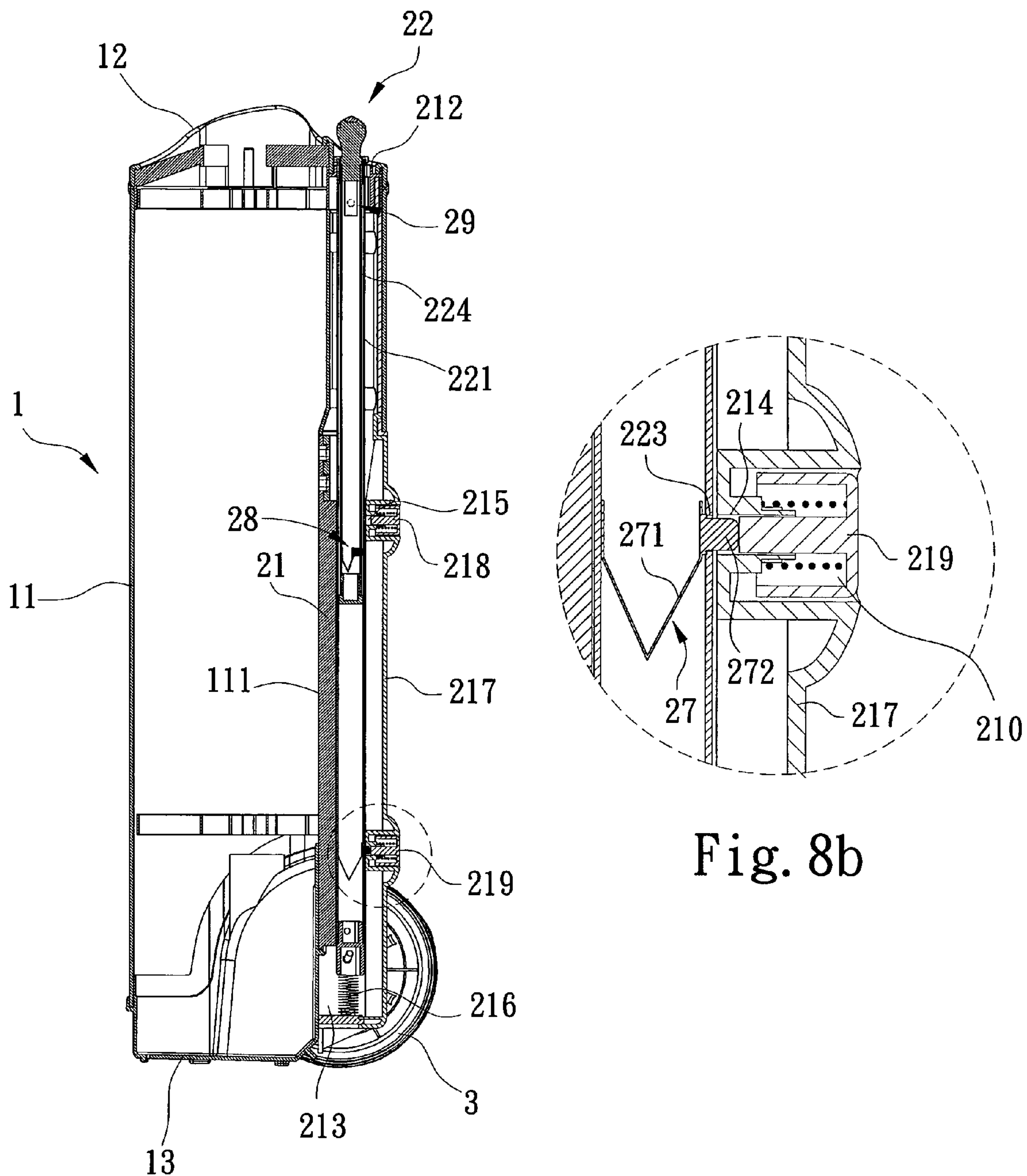
FIG. 8*a* is a sectional view of another side of the second embodiment of the present invention with an upper button and a lower button disposed respectively on the upper and the lower positioning hole of the central receiving seat.
FIG. 8*b* is an enlarged sectional view of a part of the combination of the button and the locking member taken from the FIG. 8*a*.

Referring to FIGS. 7–8*b*, in a preferred second embodiment, an elastic member 216 is disposed on the lower portion of the receiving housing 213 of the central receiving seat 21 to support and spring up the hand pull-bar 22. It makes the users pull out the hand pull-bar easily. On the surface 217 of the central receiving seat 21, there are provided with an upper and a lower button 218,219. The upper and the lower button 218,219 are respectively disposed on an upper and a lower positioning hole 214,215 of the central receiving seat 21. In the stretching and contracting stroke, the outer sleeve 221 of the hand pull-bar 22 can be positioned in the upper positioning hole 214 or the lower positioning hole 215 by the first locking member 27 contacting the upper button 218 or the lower button 219. The upper and the lower button 218,219 have restoring-force devices 210, such as spring means, and could restore its original state after being pressed.

The present invention thereby has the following advantages:

1. The present invention has a golf cart combined with a golf bag, the whole volume thereof can be largely reduced; the present invention is convenient for carrying, and thereby practicality as well as convenience thereof are increased.
2. The present invention is designed that the diameters of the wheels are larger than the heights of the spaces respectively at both sides at the bottom of the golf cart, the whole structure can be towed by rolling of the wheels both in collapsing and stretching states, it is extremely convenient in use.
3. The present invention is fast in stretching and collapsing; thereby it is convenient for operation.
4. The buttons disposed on the central receiving seat in the present invention enable the users press easily and prevent clipping by the snap catch. The elastic member disposed on the lower position of the receiving housing of the central receiving seat provides effort-saving function for pulling out the hand pull-bar.

Accordingly, the present invention not only can get rid of the defects resided in the conventional combinations of golf bags with golf carts, the designing of the combination unit of a golf cart structure with a golf bag of the present invention can get the effects of simplicity for operation and convenience for carrying etc. by ability of being towed by rolling both in collapsing and stretching states, thereby practicality as well as convenience thereof are largely increased.

Having thus described my invention with value of practical utility, what I claim as new and desire to be secured by Letters Patent of the United States are:

1. A combination unit of a golf cart and a golf bag comprising:

a) a golf bag having:
   i) an inner housing having a groove;
   ii) a frame connected to a top of the inner housing; and
   iii) a bottom portion having two receiving spaces on lateral sides thereof, the bottom portion connected to a bottom of the inner housing; and
b) a golf cart structure having:
   i) a central receiving seat having an upper positioning hole, a lower positioning hole and two openings located on lateral sides thereof, the central receiving seat being externally positioned on a middle and lower portion of the golf bag within the groove of the inner housing of the golf bag;
   ii) a retractable handle bar having:
      I) an outer sleeve having an upper engaging hole and a first locking member, the outer sleeve being moveable between a closed position and an open position, the first locking member removably engaging the lower positioning hole of the central receiving seat in the closed position and removably engaging the upper positioning hole of the central receiving seat in the opened position; and II) an inner sleeve slidably inserted into the outer sleeve;

iii) two struts, each of the two struts being pivotally connected to the central receiving seat at a first end and a pair of wheels at a second end thereof; and iv) two links, each link pivotally connected to a central portion of one of the two struts at a first link end and a bottom wall of the outer sleeve at a second link end, wherein the wheels on the struts are moveable between a position adjacent to the two receiving spaces when the outer sleeve of the handle is in the closed position and a position extending from the golf cart structure when the outer sleeve of the handle is in the open position, wherein the two struts and two links are inserted into the two openings in the central receiving seat when the outer sleeve of the handle is in the closed position, wherein the inner sleeve includes a second locking member, the second locking member frictionally engaging the outer sleeve in the closed position and removably engaging the upper engaging hole of the outer sleeve in the opened position, wherein the inner sleeve has a third locking member removably engaging the upper engaging hole of the outer sleeve in the closed position.

2. The combination unit of a golf cart and a golf bag according to claim 1, wherein the first locking member includes a first folded spring leaf and a first snap catch.

3. The combination unit of a golf cart and a golf bag according to claim 1, wherein the second locking member includes a second folded spring leaf and a second snap catch.

4. The combination unit of a golf cart and a golf bag according to claim 1, wherein the third locking member includes a third folded spring leaf and a third snap catch.

5. The combination unit of a golf cart and a golf bag according to claim 1, wherein the central receiving seat has two joints, each of the two struts are pivotally connected to the central receiving seat at the first end by one of the two joints.

6. The combination unit of a golf cart and a golf bag according to claim 1, wherein the two wheels have diameters larger than heights of the receiving spaces, such that the two wheels movably support one end of the golf bag in both the open and closed positions when a moving force is applied to the handle.

7. The combination unit of a golf cart and a golf bag according to claim 1, wherein the frame of the golf bag has a plurality of mutually spaced partition plates and three circle frames.

8. The combination unit of a golf cart and a golf bag according to claim 7, wherein two of the three circle frames have bottoms above the bottom portion of the golf bag.

9. The combination unit of a golf cart and a golf bag according to claim 1, wherein the central receiving seat has a sliding auxiliary portion.

10. The combination unit of a golf cart and a golf bag according to claim 1, wherein the central receiving seat is provided with a receiving housing, the stretchable and contractible handle bar is movable or fixed at the upper positioning hole or at the lower positioning hole within the receiving housing; an upper and a lower button with restoring-force devices are respectively disposed on the upper and lower positioning holes of the central receiving seat.

11. The combination unit of a golf cart and a golf bag according to claim 10, wherein an elastic member is disposed on the lower portion of the receiving housing of the central receiving seat to support and spring up the handle bar.

* * * * *